United States Patent
Araki et al.

(10) Patent No.: US 10,093,313 B2
(45) Date of Patent: Oct. 9, 2018

(54) VEHICLE CONTROL DEVICE

(71) Applicant: TOYOTA JIDOSHA KABUSHIKI KAISHA, Toyota-shi (JP)

(72) Inventors: Masaru Araki, Toyota (JP); Yasushi Okada, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 15 days.

(21) Appl. No.: 15/354,046

(22) Filed: Nov. 17, 2016

(65) Prior Publication Data

US 2017/0253238 A1 Sep. 7, 2017

(30) Foreign Application Priority Data

Mar. 4, 2016 (JP) ................................. 2016-041748

(51) Int. Cl.
*B60W 10/18* (2012.01)
*B60W 30/09* (2012.01)

(52) U.S. Cl.
CPC .......... *B60W 30/09* (2013.01); *B60W 10/182* (2013.01); *B60W 2710/18* (2013.01)

(58) Field of Classification Search
None
See application file for complete search history.

(56) References Cited

U.S. PATENT DOCUMENTS

| | | | | |
|---|---|---|---|---|
| 7,344,205 B2 * | 3/2008 | Kamiya | ................... | B60T 7/22 303/124 |
| 2004/0016612 A1 * | 1/2004 | Iwagawa | ................. | B60T 7/107 188/265 |
| 2005/0264099 A1 * | 12/2005 | Kamiya | ................... | B60T 7/22 303/15 |
| 2010/0062897 A1 * | 3/2010 | Nishino | ................... | B60T 1/10 477/29 |
| 2013/0116904 A1 | 5/2013 | Watanabe et al. | | |
| 2013/0275019 A1 * | 10/2013 | Murata | ..................... | B60T 7/12 701/70 |

(Continued)

FOREIGN PATENT DOCUMENTS

JP 2008213683 A * 9/2008 ............. B60T 1/005
JP 2011-93352 A 5/2011

(Continued)

OTHER PUBLICATIONS

JP-2008213683-A English Translation.*

Primary Examiner — Rami Khatib
(74) Attorney, Agent, or Firm — Oblon, McClelland, Maier & Neustadt, L.L.P.

(57) ABSTRACT

A decrease in a terminal voltage of a battery is suppressed in a vehicle control device having a function of driving a pump motor to operate an automatic brake, and a function of driving an EPB motor to operate an EPB. When a brake ECU receives an EPB request during the operation of the automatic brake, and an elapsed period after a start of the automatic brake becomes more than a first set period t1, the brake ECU starts the EPB motors. Moreover, when the brake ECU receives an automatic brake request during the operation of the EPB, and an elapsed period after a start of the EPB is not more than a second set period t2, the brake ECU suspends the operation of the EPB, and starts the automatic brake.

2 Claims, 7 Drawing Sheets (56) References Cited

U.S. PATENT DOCUMENTS

| | | | |
|---|---|---|---|
| 2015/0145321 A1* | 5/2015 | Yuasa | B60T 13/662 |
| | | | 303/3 |
| 2015/0175137 A1* | 6/2015 | Murata | B60T 7/107 |
| | | | 701/70 |
| 2016/0207532 A1 | 7/2016 | Kida | |
| 2017/0349153 A1* | 12/2017 | Yamashita | B60T 8/48 |

FOREIGN PATENT DOCUMENTS

| | | |
|---|---|---|
| JP | 2015-34484 A | 2/2015 |
| JP | 2015-49665 | 3/2015 |
| WO | WO 2011/158855 A1 | 12/2011 |

* cited by examiner

VEHICLE CONTROL DEVICE

BACKGROUND OF THE INVENTION

1. Field of the Invention

The present invention relates to a vehicle control device having a function of operating an automatic brake when an own vehicle is likely to collide with an obstacle and a function of operating an electric parking brake in response to an operation of a driver.

2. Description of the Related Art

Hitherto, there is known a device for operating an automatic brake when an own vehicle is likely to collide with an obstacle. For example, a driving support device proposed in Japanese Patent Application Laid-open No. 2015-49665 includes a clearance sonar for detecting a distance from an own vehicle to an obstacle, and is configured to determine whether or not the own vehicle is likely to collide with the obstacle based on the distance detected by the clearance sonar. When the own vehicle is determined to be likely to collide with the obstacle, a pump motor provided in a brake actuator is driven so that a pump rotates to increase a hydraulic pressure in a wheel cylinder. As a result, the automatic brake operates independently of absence/presence of a brake pedal operation of a driver, and the collision of the own vehicle and the obstacle with each other can thus be avoided. For example, when the driver is carrying out a garaging operation in a narrow parking space, and the own vehicle is likely to collide with a garage wall, the automatic brake operates, and consequently, the collision can be avoided.

Moreover, as a parking brake, there is known an electric parking brake (referred to as EPB) that does not require an operation force of the driver to pull a parking brake cable. For example, a vehicle braking control device proposed in WO 2011/158855 A1 is configured to drive a parking motor (referred to as EPB motor) provided in a caliper based on a switch operation of a driver, thereby pressing brake pads against a brake disc by a rotational force of the EPB motor. As a result, the driver can bring wheels into a lock state by a light switch operation.

Incidentally, the following problem occurs in a vehicle having the function of driving the pump motor to operate the automatic brake, and the function of driving the EPB motor to operate the EPB. For example, under a situation in which the driver is carrying out the garaging operation at a very low speed, when the vehicle approaches the garage wall or the like and the automatic brake is thus operated, the driver may simultaneously carry out the switch operation for operating the EPB.

Figure 7:
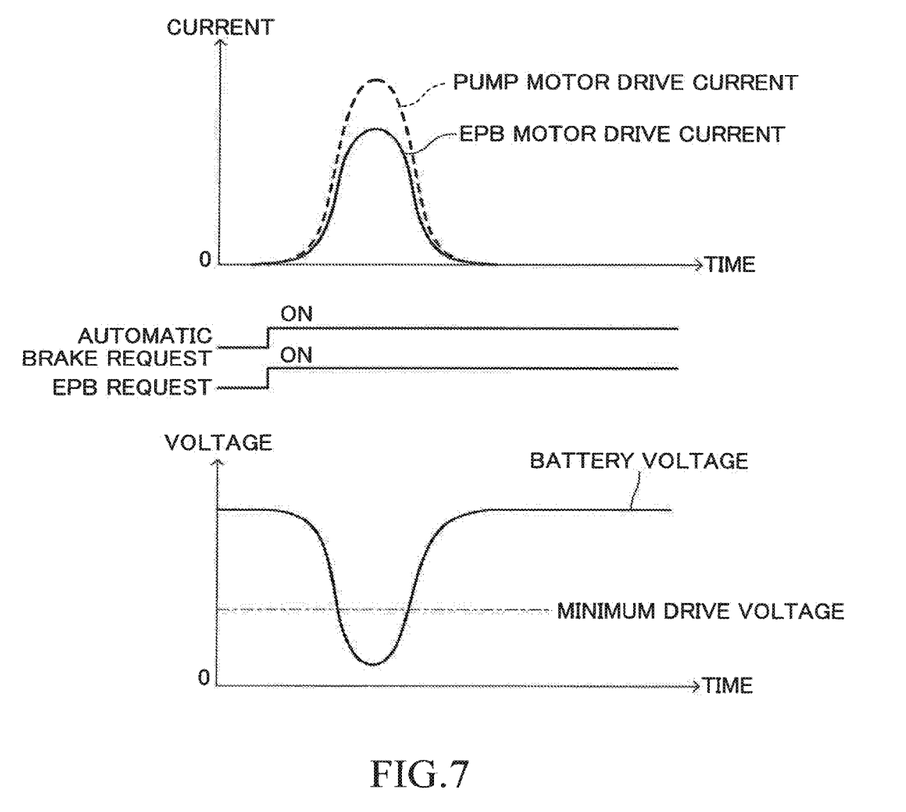
FIG. 7 is a graph for showing a relationship between rush currents and a battery terminal voltage.

When the pump motor and the EPB motor are started respectively, large currents temporarily flow from a battery to the pump motor and the EPB motor. This large current that temporarily flows is referred to as rush current. Therefore, when the pump motor and the EPB motor are simultaneously started, as shown in FIG. 7, period in which the rush currents flow through the pump motor and period in which the rush currents flow through the EPB motor overlap each other. The currents flow through the pump motor and the EPB motor from a common battery, and when the rush currents required for the start are caused to flow through both the motors, a terminal voltage of the battery greatly decreases.

When the terminal voltage of the battery decreases below the minimum drive voltage required for the respective functions, the respective functions stop. This problem can be solved by increasing power supply performance of the battery, but this solution consequently leads to increases in a cost, a vehicle weight, a battery installation space, and the like.

SUMMARY OF THE INVENTION

The present invention has been made in order to solve the above-mentioned problem, and therefore has an object to suppress a decrease in the terminal voltage of a battery without changing power supply performance of the battery.

In order to achieve the above-mentioned object, a feature of one embodiment of the present invention resides in a vehicle control device, comprises:

a brake actuator (100) including a braking motor (87) for generating a braking force on a wheel of an own vehicle during travel of the own vehicle;

a parking motor (200) for operating an electric parking brake;

automatic brake request means (20) for outputting an automatic brake request when the own vehicle is likely to collide with an obstacle;

parking brake request means (12) for outputting a parking brake request in response to a parking brake operation carried out by a driver;

brake control means (10) for driving the braking motor to operate an automatic brake when the automatic brake request is output from the automatic brake request means, and driving the parking motor to operate the electric parking brake when the parking brake request is output from the parking brake request means; and start timing adjustment means (S15) for shifting a start timing of any one of the braking motor and the parking motor so that a period in which a rush current flows through the braking motor when the braking motor is started and a period in which a rush current flows through the parking motor when the parking motor is started do not overlap each other.

The braking motor and the parking motor being configured to be driven by electric power supplied from an in-vehicle battery.

In the vehicle control device according to the one embodiment of the present invention, the automatic brake request means is configured to output the automatic brake request when the own vehicle is likely to collide with an obstacle. This automatic brake request is input to the brake control means. The brake control means is configured to drive the braking motor provided in the brake actuator when the automatic brake request is output from the automatic brake request means. As a result, the automatic brake (function of generating the braking force on the wheel independently of the brake operation of the driver) operates, and the vehicle can forcefully be stopped.

Moreover, in the vehicle control device, the parking brake request means is configured to output the parking brake request when the driver carries out the parking brake operation. This parking brake request is input to the brake control means. The parking brake request may be, for example, a signal of an operation carried out by the driver so as to operate the parking brake. The brake control means is configured to drive the parking motor to operate the electric parking brake when the parking brake request is output from the parking brake request means. As a result, the driver can bring wheels in a lock state by a light operation.

The braking motor and the parking motor are supplied with the electric power by the in-vehicle battery. When the automatic brake request and the parking brake request are output approximately simultaneously, and the braking motor and the parking motor are started in accordance with those requests, the period in which the rush current flows through the braking motor and the period in which the rush current flows through the parking motor overlap each other. In this case, large currents flow from the in-vehicle battery and a terminal voltage of the in-vehicle battery greatly decreases, and there is such a fear that the respective motors cannot be appropriately driven.

Thus, the vehicle control device according to the one embodiment of the present invention includes the start timing adjustment means. The start timing adjustment means is configured to shift the start timing of any one of the braking motor and the parking motor so that the period in which the rush current flows through the braking motor when the braking motor is started and the period in which the rush current flows through the parking motor when the parking motor is started do not overlap each other. As a result, decrease of the terminal voltage of the in-vehicle battery can be suppressed without changing the power supply performance of the in-vehicle battery. As a result, the respective motors can be appropriately driven. The period in which the rush current flows through the braking motor and the period in which the rush current flows through the parking motor can be predicted based on, for example, elapsed periods after the starts of the respective motors.

A feature of one aspect of the present invention resides in that the start timing adjustment means is configured to:

delay timing for starting the parking motor when the parking brake request is output from the parking brake request means during a period in which the rush current is flowing through the braking motor after the braking motor is started (S13, S15); and suspend drive of the parking motor and start the braking motor when the automatic brake request is output from the automatic brake request means during a period in which the rush current is flowing through the parking motor after the parking motor is started (S16, S19, S20).

According to the one aspect of the present invention, the timing for starting the parking motor is delayed when the parking brake request is output from the parking brake request means during the period in which the rush current is flowing through the braking motor after the braking motor is started. Thus, the drive of the braking motor can be further continued, thereby generating the braking force on the wheel. In other words, the automatic braking can be continued. In this case, it is preferred that the parking motor be started, for example, after the period in which the rush current is flowing through the braking motor ends.

Moreover, the drive of the parking motor is suspended and the braking motor is started when the automatic brake request is output from the automatic brake request means during the period in which the rush current is flowing through the parking motor after the parking motor is started. As a result, the operation of the automatic brake can be started without a delay in response to the automatic brake request. In this case, it is preferred that the parking motor be restarted, for example, after the period in which the rush current is flowing through the braking motor ends.

The automatic brake is a brake for avoiding a collision of the own vehicle with an obstacle, and hence it is desired to quickly start the operation in response to the automatic brake request. On the other hand, the electric parking brake is a brake for maintaining the vehicle in the stop state, and hence responsiveness is not required compared with the automatic brake. Thus, according to the one aspect of the present invention, when the automatic brake request and the parking brake request are output approximately simultaneously, the automatic brake request is prioritized, and the braking motor is driven. Thus, both the functions of the automatic brake for the collision avoidance and the electric parking brake can appropriately operate.

A feature of one aspect of the present invention resides in that the automatic brake request means includes a clearance sonar (13) for detecting a distance from the own vehicle to the obstacle, and is configured to output the automatic brake request based on the distance detected by the clearance sonar.

According to the one aspect of the present invention, the automatic brake request is output based on the distance detected by the clearance sonar. For example, when the distance detected by the clearance sonar is less than a set distance set in advance, the automatic brake request is output. As a result, even when the driver carries out the parking brake operation in a state where the automatic brake is operated because the own vehicle approaches an obstacle, e.g., a garage wall during, for example, a garaging operation, the automatic brake can be positively operated, and the collision of the own vehicle with the obstacle can be avoided. Alternatively, the collision can be alleviated.

In the above description, reference numerals used in an embodiment of the present invention are enclosed in parentheses and are assigned to each of the constituent features of the invention corresponding to the embodiment in order to facilitate understanding of the invention. However, each of the constituent features of the invention is not limited to the embodiment defined by the reference numerals.

DETAILED DESCRIPTION OF THE PREFERRED EMBODIMENTS

Figure 1:
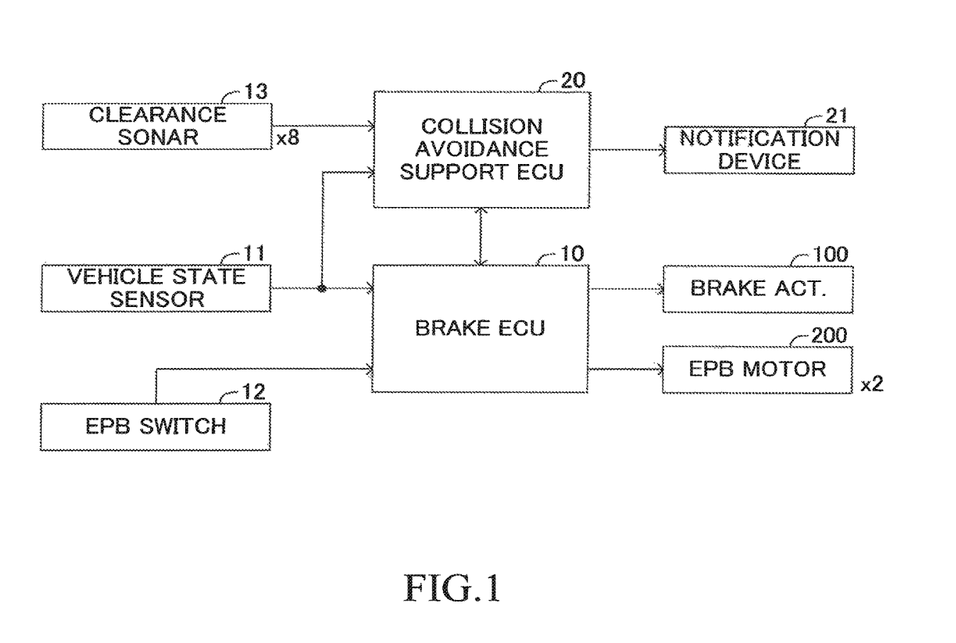
FIG. 1 is a schematic system configuration diagram for illustrating a vehicle control device according to an embodiment of the present invention.

Referring to the accompanying drawings, an embodiment of the present invention is described in detail below. FIG. 1 is a schematic system configuration diagram for illustrating a vehicle control device according to this embodiment.

The vehicle control device includes a brake ECU 10 and a collision avoidance support ECU 20 respectively including microcomputers as principal components. The vehicle control device is supplied with electric power from an in-vehicle battery (not shown) (hereinafter simply referred to as battery). The brake ECU 10 and the collision avoidance support ECU 20 are connected to each other for mutual communication. "ECU" is an abbreviation of electric control unit. The microcomputer herein includes a CPU and storage devices such as a ROM and a RAM, and the CPU is configured to implement various functions by executing instructions (programs) stored in the ROM. Moreover, the vehicle on which the vehicle control device is installed is referred to as "own vehicle" when the vehicle needs to be distinguished from other vehicles.

The brake ECU 10 is a control device for independently controlling braking forces for front/rear left/right wheels in accordance with a vehicle state. The brake ECU 10 is connected to a vehicle state sensor 11 and an electric parking brake switch 12 (referred to as EPB switch 12).

The vehicle state sensor 11 includes, for example, wheel speed sensors for respectively detecting wheel speeds of the front/rear left/right wheels (hereinafter referred to as four wheels), a yaw rate sensor for detecting a yaw rate of a vehicle body, an acceleration sensor for detecting an acceleration in a horizontal direction of the vehicle, a steering angle sensor for detecting a steering angle, a shift position sensor for detecting a shift position, and a brake operation amount sensor for detecting an operation amount of a brake pedal. Moreover, the brake ECU 10 is configured to calculate a vehicle speed (vehicle body speed) based on the wheel speeds of the four wheels, and supply vehicle speed information to various types of in-vehicle ECUs (not shown) including the collision avoidance support ECU 20.

The EPB switch 12 is an operation switch for the driver to instruct to apply and release an electric parking brake (hereinafter referred to as EPB), and is provided at a position where the driver can operate the EPB switch 12 in a posture in which the driver is seated in a driver's seat. The EPB switch is configured to output an operation signal in accordance with the operation of the driver to the brake ECU 10.

Figure 3:
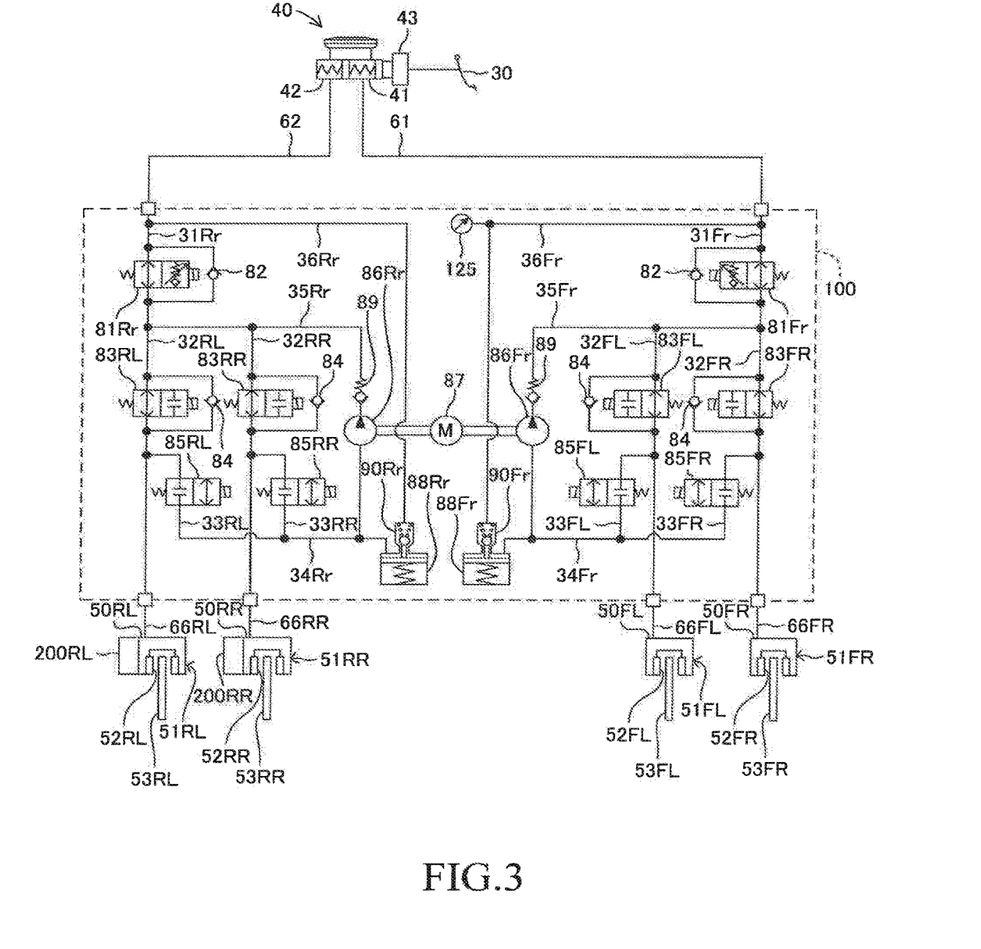
FIG. 3 is a configuration diagram for illustrating a brake actuator.

The brake ECU 10 is connected to a brake actuator 100. As illustrated in FIG. 3, the brake actuator is provided in a hydraulic flow passage between a master cylinder 40 and wheel cylinders 50FR, 50FL, 50RR, and 50RL for the four wheels. The master cylinder 40 includes a first pressurization chamber 41 and a second pressurization chamber 42, and is configured to pressurize working fluid by a forward movement of a pressurization piston by a depression operation force of the brake pedal 30 assisted by a booster 43, thereby generating master cylinder pressures independently in the first pressurization chamber 41 and the second pressurization chamber 42. The first pressurization chamber 41 is configured to supply the generated master cylinder pressure to the brake actuator 100 via a first master pipe 61. The second pressurization chamber 42 is configured to supply the generated master cylinder pressure to the brake actuator 100 via a second master pipe 62.

Herein, "FL" is added to reference numeral of a member relating to the braking for the front left wheel; "FR", for the front right wheel; "RL", for the rear left wheel; and "RR", for the rear right wheel. Moreover, "Fr" is added to reference numeral of a member relating to the braking for the front left and right wheels; and "Rr", for the rear left and right wheels. Moreover, when the wheel position does not need to be specified for a description, "FL", "FR", "RL", "RR", "Fr", and "Rr" may be omitted.

The brake actuator 100 includes a main passage 31Fr connected to the first master pipe 61, a main passage 31Rr connected to the second master pipe 62, individual passages 32FR and 32FL provided so as to bifurcate from the main passage 31Fr, and individual passages 32RR and 32RL provided so as to bifurcate from the main passage 31Rr. The individual passage 32FR is connected to the wheel cylinder 50FR via an individual pipe 66FR. The individual passage 32FL is connected to the wheel cylinder 50FL via an individual pipe 66FL. The individual passage 32RR is connected to the wheel cylinder 50RR via an individual pipe 66RR. The individual passage 32RL is connected to the wheel cylinder 50RL via an individual pipe 66RL.

A main cut valve 81Fr is provided in a course of the main flow passage 31Fr. A main cut valve 81Rr is provided in a course of the main flow passage 31Rr. The main cut valves 81Fr and 81Rr are normally-open type electromagnetic valves for maintaining an open state when currents are not supplied to solenoids, and are control valves configured to have opening degrees (referred to as differential pressure state) corresponding to a difference in pressure between an upstream side and a downstream side of a valve body as a result of the current supplied to the solenoids. The main cut valves 81Fr and 81Rr are configured to be capable of not only closing the valve bodies but also controlling the pressure differences, each of which is acquired by subtracting a downstream pressure from an upstream pressure, by controlling the current supply amounts to the solenoids.

Moreover, check valves 82 are provided respectively in parallel with the main cut valves 81Fr and 81Rr on the main passages 31Fr and 31Rr. Each of the check valves 82 is configured to bypass the main cut valve 81 to permit a flow from the upstream side to the downstream side of the main cut valve 81 and shut off a flow in the opposite direction. Pressure increasing valves 83FR, 83FL, 83RR, and 83RL are provided respectively on the individual passages 32FR, 32FL, 32RR, and 32RL. Each of the pressure increasing valves 83 is a normally-open type electromagnetic on-off valve configured to be brought into a closed state only when a current is supplied to a solenoid. Moreover, check valves 84 are provided respectively in parallel with the pressure increasing valves 83FR, 83FL, 83RR, and 83RL on the individual passages 32FR, 32FL, 32RR, and 32RL. Each of the check valves 84 is configured to bypass the pressure increasing valve 83 to permit a flow from the downstream side to the upstream side of the pressure increasing valve 83 and shut off a flow in the opposite direction.

Individual reservoir passages 33FR, 33FL, 33RR, and 33RL are respectively provided on the individual passages 32FR, 32FL, 32RR, and 32RL so as to branch respectively from the downstream sides of the pressure increasing valves 83FR, 83FL, 83RR, and 83RL. Pressure decreasing valves 85FR, 85FL, 85RR, and 85RL are respectively provided on the individual reservoir passages 33FR, 33FL, 33RR, and 33RL. Each of the pressure decreasing valves 85 is a normally-closed type electromagnetic on-off valve configured to be brought into an open state only when a current is supplied to a solenoid. The individual reservoir passages 33FR and 33FL are connected to a reservoir passage 34Fr. The individual reservoir passages 33RR and 33RL are connected to a reservoir passage 34Rr.

A pressure regulation reservoir 88Fr is connected to the reservoir passage 34Fr. Moreover, a pressure regulation reservoir 88Rr is connected to the reservoir passage 34Rr. Thus, when each of the pressure decreasing valves 85FR and 85FL is in the open state, the working fluid in each of the wheel cylinders 50FR and 50FL can be returned to the pressure regulation reservoir 88Fr, thereby decreasing a liquid pressure in each of the wheel cylinders 50FR and 50FL. Moreover, when each of the pressure decreasing valves 85RR and 85RL is in the open state, the working fluid in each of the wheel cylinders 50RR and 50RL can be returned to the pressure regulation reservoir 88Rr, thereby decreasing a liquid pressure in each of the wheel cylinders 50RR and 50RL.

One end of a pump passage 35Fr is connected to the reservoir passage 34Fr. The other ends of the pump passage 35Fr are connected to the individual passages 32FR and 32FL, respectively. Similarly, one end of a pump passage 35Rr is connected to the reservoir passage 34Rr. The other ends of the pump passage 35Rr are connected to the individual passages 32RR and 32RL, respectively. A pump 86Fr is provided in the course of the pump passage 35Fr. A pump 86Rr is provided in the course of the pump passage 35Rr. The pumps 86Fr and 86Rr are coupled to a common pump motor 87, and are rotated by rotation of the pump motor 87. The pump 86Fr is configured to draw the working fluid stored in the pressure regulation reservoir 88Fr, thereby supplying the working fluid to the individual passages 32FR and 32FL. The pump 86Rr is configured to draw the working fluid stored in the pressure regulation reservoir 88Rr, thereby supplying the working fluid to the individual passages 32RR and 32RL. A check valve 89 is provided on an outlet side of each of the pumps 86Fr and 86Rr. Each of the check valves 89 is a valve configured to open when a differential pressure between an upstream side (pump 86 side) and a downstream side of the check valve 89 is equal to or more than a predetermined pressure, thereby permitting the flow of the working fluid only in the outlet direction of the pump 86.

One end of a supply passage 36Fr is connected to the main flow passage 31Fr at a position upstream of the main cut valve 81Fr. The other end of the supply passage 36Fr is connected to the pressure regulation reservoir 88Fr via a regulating valve 90Fr. Similarly, one end of a supply passage 36Rr is connected to the main flow passage 31Rr at a position upstream of the main cut valve 81Rr. The other end of the supply passage 36Rr is connected to the pressure regulation reservoir 88Rr via a regulating valve 90Rr. Each of the regulating valves 90 is provided at a top portion of the pressure regulation reservoir 88, and its valve body moves in correspondence with the position of a piston provided inside the pressure regulation reservoir 88, thereby switching between an open state and a closed state. The piston is configured to stroke in correspondence with the amount of the working fluid stored in the pressure regulation reservoir 88. Thus, the regulating valve 90 is configured to open only when the amount of the working fluid in the pressure regulation reservoir 88 is equal to or less than a set amount, thereby permitting the flow of the working fluid from the master cylinder 40 to the pressure regulation reservoir 88. As a result, when the supply of the working fluid to the pressure regulation reservoir 88 is necessary, the flow of the working fluid from the master cylinder 40 to the pressure regulation reservoir 88 is permitted, and when the supply of the working fluid to the pressure regulation reservoir 88 is not necessary, the flow of the working fluid from the master cylinder 40 to the pressure regulation reservoir 88 is blocked.

The brake actuator 100 includes an upstream pressure sensor 125. The upstream pressure sensor 125 is configured to output a detection signal representing a hydraulic pressure in the main passage 31Fr to the brake ECU 10.

The wheel cylinders 50FR, 50FL, 50RR, and 50RL are respectively integrated into brake calipers 51FR, 51FL, 51RR, and 51RL, and are configured to respectively use the hydraulic pressure supplied from the brake actuator 100 to press brake pads 52FR, 52FL, 52RR, and 52RL provided in the brake calipers 51FR, 51FL, 51RR, and 51RL against brake discs 53FR, 53FL, 53RR, and 53RL rotating integrally with the wheels. As a result, a braking force is applied to the wheel by a friction force generated between the brake pads 52 and the brake disc 53.

Moreover, motors 200RR and 200RL (hereinafter generally referred to as EPB motor 200) for the EPB operation are respectively provided in the brake calipers 51RR and 51RL provided in the rear wheels. The EPB motor 200 is configured to apply a force for forward/backward moving the brake pads 52 via a gear mechanism (not shown). For example, the brake pads 52 is pressed against the brake disk 53 by a forward rotation of the EPB motor 200, and the brake pads 52 is separated from the brake disc 53 by a backward rotation of the EPB motor 200. As the EPB motor 200 and the gear mechanism constructing the EPB, publicly known components described in, for example, WO 2011/158855 A1 may be employed.

The EPB motors 200 are connected to the brake ECU 10. The brake ECU 10 includes an EPB motor drive circuit (not shown) for driving the EPB motors 200, and is configured to control the current supply to the EPB motors 200 in accordance with an operation signal output by the EPB switch 12, thereby switching a state of the EPB between a lock state and an unlock state. The signal output by the EPB switch 12 for switching the state of the EPB to the lock state corresponds to a parking brake request according to the present invention. Thus, the signal for switching the state of the EPB to the lock state is hereinafter referred to as EPB request.

The brake ECU 10 is configured to read a vehicle speed V at a current time point, and receive the EPB request output from the EPB switch 12 only when the vehicle speed V is less than a parking brake permission vehicle speed V1 set in advance. Thus, only when the vehicle speed V is less than the parking brake permission vehicle speed V1, the EPB motors 200 can be driven.

The electromagnetic valves (main cut valves 81, pressure increasing valves 83, and pressure decreasing valves 85), and the pump motor 87 provided in the brake actuator 100 are connected to the brake ECU 10. The brake ECU 10 includes an electromagnetic valve drive circuit (not shown) and a pump motor drive circuit (not shown), and is configured to control the operation of the brake actuator 100 (electromagnetic valves and pump motor 87) based on a vehicle state detected by the vehicle state sensor 11 and an automatic brake command output from the collision avoidance support ECU 20.

The brake ECU 10 is configured to operate the brake actuator 100 only when the brake control is necessary, thereby adjusting the hydraulic pressure of each of the wheel cylinders 50 of the four wheels to increase or decrease independently of one another. The brake ECU 10 is configured to bring the current supply to the brake actuator 100 into a stop state when the brake control is not necessary (in a normal state). In this case, the open/close states of the respective valves are states as illustrated in FIG. 3, and the hydraulic pressure output by the master cylinder 40 is directly transmitted to the wheel cylinders 50. In other words, the hydraulic pressure corresponding to the brake pedal operation of the driver can be supplied to the wheel cylinders 50.

When the brake ECU 10 decreases the braking forces (in this case, forces of stopping the rotations of the wheels) generated on the wheels, for example, as in the case of antilock control, the brake ECU 10 closes the pressure increasing valves 83 and opens the pressure decreasing valves 85, thereby decreasing the hydraulic pressures in the wheel cylinders 50. Thus, even when the driver depresses the brake pedal too strongly (deeply) and the wheels may be locked, the wheels can be prevented from being locked.

Moreover, when the brake ECU 10 forcefully generates the braking forces on the wheels while the vehicle is traveling, the brake ECU 10 supplies the currents to the main cut valves 81Fr and 81Rr, thereby bringing the main cut valves 81Fr and 81Rr into the differential pressure state, and drives the pump motor 87 to operate the pump 86. As a result, the hydraulic pressure pressurized by the pump 86 is supplied to the wheel cylinders 50 via the pressure increasing valves 83. Thus, even when the driver is not carrying out the brake pedal operation, the braking forces can be generated on the wheels simultaneously with the start of the pump 86. This hydraulic pressure control (braking force control) can be carried out for the wheels to be controlled. Thus, it is possible to increase/decrease the hydraulic pressures simultaneously on the four wheels, and to increase/decrease the hydraulic pressure on a specific wheel. The pump motor 87 corresponds to a braking motor according to the present invention.

A description is now given of the collision avoidance support ECU 20. The collision avoidance support ECU 20 is a main control unit for constructing a system for supporting driving of the driver so that the vehicle does not collide with a garage wall and the like mainly when the driver parks the vehicle in a parking space.

Figure 2:
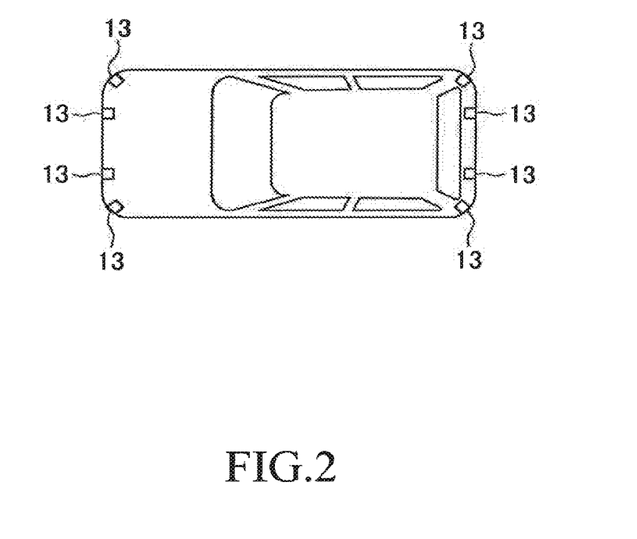
FIG. 2 is a plan view of a vehicle for illustrating installation positions of clearance sonars.

The collision avoidance support ECU 20 is connected to the clearance sonars 13 and the vehicle state sensor 11. As illustrated in FIG. 2, a total of eight clearance sonars 13 are provided, that is, two are provided on a front surface of a front bumper so as to be separated by a predetermined interval in a vehicle width direction; one, on each of left and right corners of the front bumper; two, on a rear surface of a rear bumper so as to be separated by a predetermined interval in the vehicle width direction; and one, on each of left and right corners of the rear bumper. The number and the installation positions of the clearance sonars 13 are not limited to those of this configuration.

The clearance sonar 13 is, for example, an ultrasonic sensor, and is configured to detect, based on a period until an ultrasonic wave transmitted by the clearance sonar 13 is reflected by an obstacle (3D object), and then is received, a distance from the clearance sonar 13 to the obstacle (distance from the own vehicle to the obstacle). The distance that can be detected by the clearance sonar 13 is relatively short, and is, for example, some centimeters to about 100 centimeters.

The collision avoidance support ECU 20 is connected to a notification device 21. The notification device 21 may be a buzzer or a speaker for appealing to the auditory sense of the driver or may be a display device for appealing to the visual sense of the driver, as long as the device can attract attention of the driver.

The collision avoidance support ECU 20 is configured to output, when an obstacle is detected by the clearance sonar 13, attention attraction corresponding to the distance (referred to as sonar detection distance) to the obstacle from the notification device 21. For example, the collision avoidance support ECU 20 is configured to sound the buzzer when the sonar detection distance is less than an attention attraction threshold, and decrease a cycle of an intermittent sound of the buzzer, or increase a volume of the buzzer as the sonar detection distance decreases. Moreover, a sound announcement may be used to change an attention attraction level.

Moreover, the collision avoidance support ECU 20 is configured to determine that the own vehicle is likely to collide with an obstacle when the sonar detection distance is less than an automatic brake threshold, and output (transmit) an automatic brake request to the brake ECU 10. The automatic brake threshold is set to a value less than the attention attraction threshold. Thus, even when the attention attraction is carried out for the driver but the own vehicle further approaches the obstacle, the automatic brake request is transmitted.

The brake ECU 10 is configured to control the brake actuator 100 to forcefully generate braking forces on the four wheels when the brake ECU 10 receives the automatic brake request transmitted from the collision avoidance support ECU 20. In other words, the brake ECU 10 is configured to supply the currents to the main cut valves 81Fr and 81Rr, thereby bringing the main cut valves 81Fr and 81Rr into the differential pressure state, and drive the pump motor 87, thereby operating the pump 86. As a result, the hydraulic pressure pressurized by the pump 86 is supplied to the wheel cylinders 50 via the pressure increasing valves 83 for the four wheels. Thus, even when the driver is not carrying out the brake pedal operation, the braking forces are generated on the four wheels simultaneously with the start of the pump 86. In other words, the automatic brake operates. As a result, the vehicle can be stopped, and the collision with the obstacle can be avoided (or can be alleviated even when the collision occurs).

This control of supporting the driver so that the vehicle does not collide with the obstacle is referred to as collision avoidance support control. The collision avoidance support control is carried out while assuming a case where the driver parks the vehicle in a parking space. Therefore, the collision avoidance support ECU 20 is configured to carry out the collision avoidance support control only when the vehicle speed V is less than a support permission vehicle speed V2. This support permission vehicle speed V2 is not as low as the parking brake permission vehicle speed V1 (V2>V1), but is set to a vehicle speed that is as low as a vehicle speed of a creep travel.

Incidentally, there is such a case where the automatic brake request and the EPB request are almost simultaneously input to the brake ECU 10. For example, such a case is conceivable that the driver is driving a vehicle for garaging in a narrow parking space at a very low speed (less than the parking brake permission speed V1) of the creep travel. In this state, when the vehicle approaches a garage wall or the like and the sonar detection distance becomes less than the automatic brake threshold, and then the driver almost simultaneously operates the EPB switch 12, the automatic brake request and the EPB request are almost simultaneously input to the brake ECU 10.

When the pump motor 87 and the EPB motors 200 are started respectively, rush currents temporarily flow from a common battery to the pump motor 87 and the EPB motors 200. Therefore, when the pump motor 87 and the EPB motors 200 are simultaneously started, periods in which the rush currents flow overlap each other, and thus the current drawn from the battery increases. As a result, a terminal voltage of the battery greatly decreases. When the terminal voltage of the battery becomes less than the lowest drive voltage required to drive the respective motors 87 and 200, the motors 87 and 200 can no longer be appropriately driven.

Thus, the brake ECU 10 is configured to prioritize the automatic brake request to delay an operation timing (start timing of the EPB motors 200) of the EPB when the automatic brake request and the EPB request are almost simultaneously input. Moreover, the brake ECU 10 is configured not to delay the automatic brake with respect to the automatic brake request.

Figure 4:
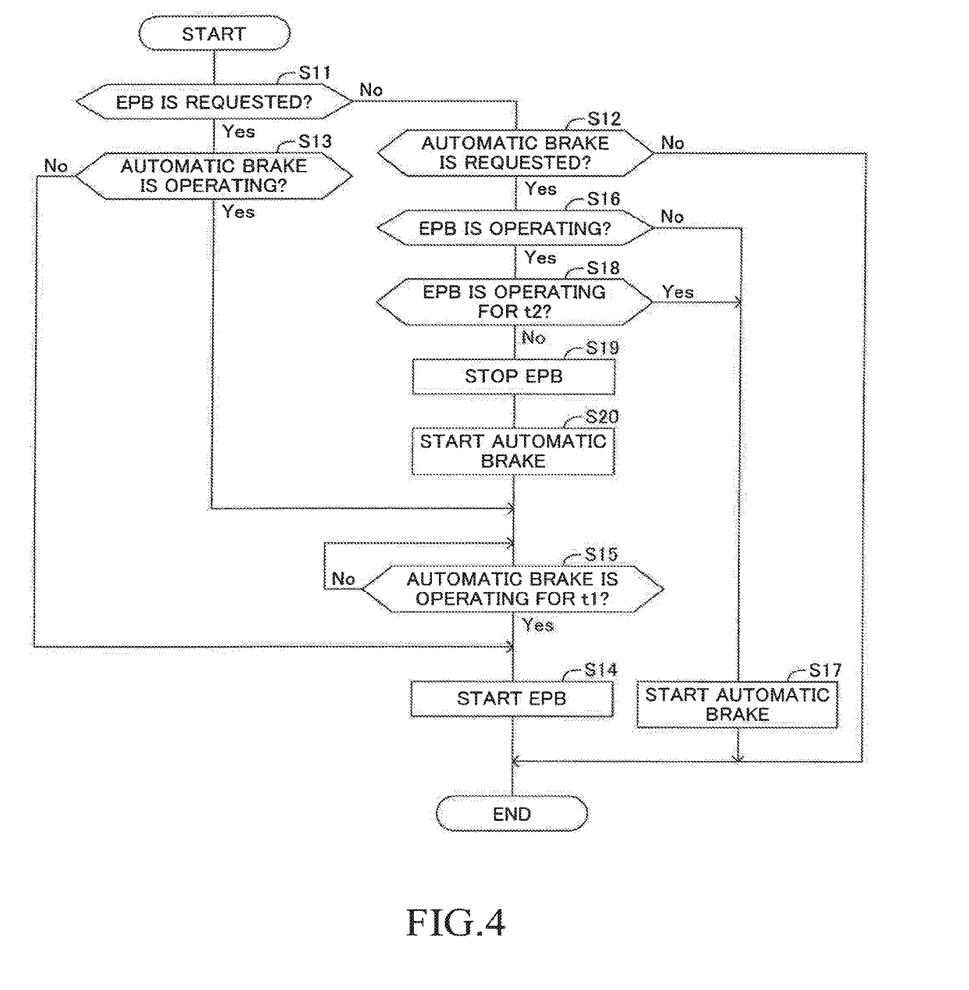
FIG. 4 is a flowchart for illustrating an automatic brake/EPB operation timing setting routine.

FIG. 4 is a flowchart for illustrating an automatic brake/EPB start timing setting routine carried out by the brake ECU 10. The brake ECU 10 executes the automatic brake/

EPB operation timing setting routine at a predetermined short calculation cycle in a period in which an ignition switch is in an on state.

When this routine starts, in Step S11, the ECU 10 first determines whether or not the EPB request exists. This determination in Step S11 is a determination as to whether or not the EPB request has been output from the EPB switch 12 immediately before. For example, the brake ECU 10 only needs to consider absence/presence of a rise of a contact signal of the EPB switch 12 as the absence/presence of the EPB request. Thus, in this routine repeated at the predetermined calculation cycle, the brake ECU 10 determines whether or not the ON operation (rise of the contact signal) of the EPB switch 12 is not detected in Step S11 for the previous time and the ON operation of the EPB switch 12 is detected in Step S11 for the current time. The ON operation means an operation on the EPB switch for bringing the EPB in the lock state.

When the EPB request does not exist (No in Step S11), in Step S12, the brake ECU 10 subsequently determines whether or not the automatic brake request exists. This determination in Step S12 is a determination as to whether or not the automatic brake request has been output from the collision avoidance support ECU 20 immediately before. Thus, the brake ECU 10 determines whether or not the automatic brake request is not received in Step S12 for the previous time and the automatic brake request is received in Step S12 for the current time.

When the brake ECU 10 makes a determination of "No" in Step S12, the brake ECU 10 once finishes this routine. The brake ECU 10 repeats the above-mentioned processing at the predetermined calculation cycle until the EPB request or the automatic brake request is received.

When the brake ECU 10 determines that the EPB request is received in Step S11, in Step S13, the brake ECU 10 determines whether or not the automatic brake is operating. When the automatic brake is not operating (when the pump motor 87 is not being driven), the brake ECU 10 causes the processing to proceed to Step S14, and starts the operation of the EPB. In other words, the brake ECU 10 starts the EPB motors 200. In this case, the EPB motors 200 are started while the pump motor 87 is stopped. Thus, even when the rush currents flow through the EPB motors 200, the terminal voltage of the battery can be prevented from decreasing below the minimum drive voltage.

On the other hand, when the automatic brake is operating (Yes in Step S13), in Step S15, the brake ECU 10 determines whether or not an elapsed period after the operation of the automatic brake is started, namely, an elapsed period after the pump motor 87 is started, is more than a first set period t1 set in advance. This first set period t1 is a period set based on a period (e.g., 100 milliseconds) in which the rush current is predicted to flow through the pump motor 87 when the pump motor 87 is started, and is set to a value by allowing a margin for the predicted period in which the rush current flows.

In Step S15, the brake ECU 10 waits for a period from the start of the operation of the automatic brake to the elapse of the first set period t1, and causes the processing to proceed to Step S14. Thus, the EPB motors 200 are prevented from being started until the first set period t1 elapses after the operation of the automatic brake is started, and the EPB motors 200 are started after the first set period t1 elapses. As a result, the start timing of the EPB motors 200 is shifted, and thereby the period in which the rush current flows through the pump motor 87 and the period in which the rush currents flow through the EPB motors 200 do not thus overlap each other. As a result, the terminal voltage of the battery can be prevented from decreasing below the minimum drive voltage.

When the brake ECU 10 determines in Step S12 that the automatic brake request is received, in Step S16, the brake ECU 10 determines whether or not the EPB is operating, that is, whether or not the EPB motors 200 are being driven. When the EPB is not operating (No in Step S16), the brake ECU 10 causes the processing to proceed to Step S17, thereby starting the automatic brake. In other words, the brake ECU 10 supplies the currents to the main cut valves 81Fr and 81Rr, thereby bringing the main cut valves 81Fr and 81Rr into the differential pressure state, and drives the pump motor 87, thereby operating the pump 86. As a result, the braking forces can be generated on the four wheels, thereby stopping the vehicle. In this case, the pump motor 87 is started while the EPB motors 200 are stopped. Thus, even when the rush current flows through the pump motor 87, the terminal voltage of the battery can be prevented from decreasing below the minimum drive voltage.

On the other hand, when a determination of "Yes" is made in Step S16, that is, the EPB is determined to be operating, in Step S18, the brake ECU 10 determines whether or not an elapsed period after the EPB starts the operation is more than a second set period t2. This second set period t2 is a period set based on a period (e.g., 100 milliseconds) in which the rush currents are predicted to flow through the EPB motors 200 when the EPB motors 200 are started, and is set to a value by allowing a margin for the predicted period in which the rush currents flow. According to this embodiment, the second set period t2 may be set to the same value as the first set period t1, or may be set to a value different from the first set period t1.

When the elapsed period after the EPB starts the operation is more than the second set period t2 (Yes in Step S18), the brake ECU 10 causes the processing to proceed to Step S17, and starts the automatic brake. In this case, the pump motor 87 is started after the period in which the rush currents flow through the EPB motors 200 has elapsed. Thus, even when the rush current flows through the pump motor 87, the terminal voltage of the battery does not decrease below the minimum drive voltage.

On the other hand, when a determination of "No" is made in Step S18, that is, when the elapsed period after the EPB starts the operation is not more than the second set period t2, in Step S19, the brake ECU 10 once stops the operation of the EPB. In other words, the drive of the EPB motors 200 is stopped in the course. Then, in Step S20, the brake ECU 10 starts the automatic brake. Therefore, the current supply to the EPB motors 200 is stopped, and then the pump motor 87 is started. Thus, even when the rush current flows through the pump motor 87, the terminal voltage of the battery can be prevented from decreasing below the minimum drive voltage.

In Step S20, the brake ECU 10 starts the automatic brake, and causes the processing to proceed to Step S15. Thus, after the first set period t1 has elapsed since the start of the automatic brake, the EPB motors 200 are restarted. As a result, the period in which the rush current flows through the pump motor 87 and the period in which the rush currents flow through the EPB motors 200 does not overlap, and the terminal voltage of the battery can thus be prevented from decreasing below the minimum drive voltage.

Figure 5:
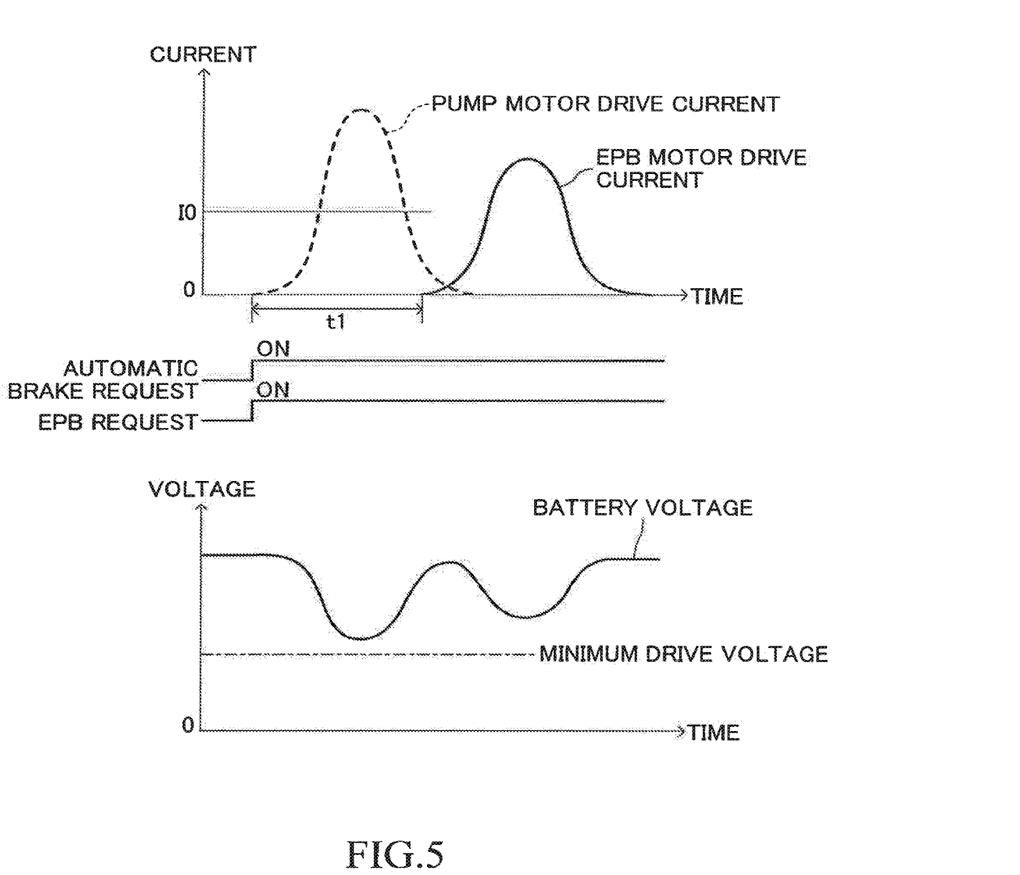
FIG. 5 is a graph for showing a relationship between rush currents and a battery terminal voltage.

FIG. 5 is a graph for showing a relationship between the rush currents flowing through the pump motor 87 and the EPB motors 200, and the battery terminal voltage when the automatic brake request and the EPB request are simultaneously input to the brake ECU 10. As appreciated from this graph, the start timings of both of the motors 87 and 200 are shifted from each other by the first set period t1, and thus the period in which the rush currents flow through the motors 87 and the period in which the rush currents flow through motors 200 do not overlap each other. As a result, the terminal voltage of the battery does not decrease below the minimum drive voltage.

The rush current herein is, for example, a current larger than a predetermined current value I0 set in advance as shown in FIG. 5. Thus, when the current flowing through the pump motor 87 is less than the predetermined current value I0, the state where the rush current is not flowing is brought about. In FIG. 5, there is a period in which the currents simultaneously flow through both the motors 87 and 200. However, in this period, the current of the pump motor 87 has decreased below the predetermined current value I0, and the currents are started to flow through the EPB motors 200. Thus, the period in which the rush currents flow through the motors 87 and the period in which the rush currents flow through motors 200 do not overlap. Moreover, the first set period t1 is set in advance by adding the margin period to the period required for the rush current to finish flowing through the pump motor 87 (for the current value to decrease below the predetermined current value I0). Thus, the start timing of the EPB motors 200 can be shifted so that the period in which the rush current flows through the pump motor 87 and the period in which the rush currents flow through the EPB motors 200 do not overlap each other.

Figure 6:
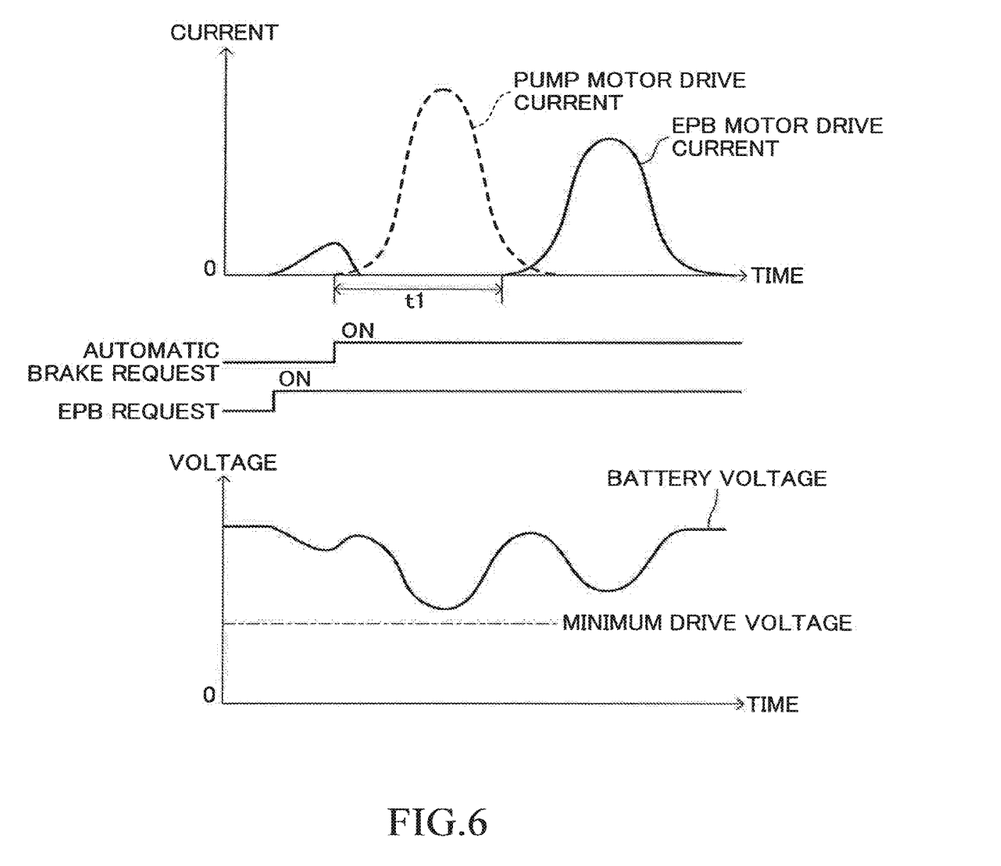
FIG. 6 is a graph for showing a relationship between rush currents and a battery terminal voltage.

FIG. 6 is a graph for showing a relationship between the rush currents flowing through the pump motor 87 and the EPB motors 200, and the battery terminal voltage when the automatic brake request is input to the brake ECU 10 after the EPB request. As appreciated from this graph, the drive of the EPB motors is suspended during the first set period t1 in correspondence with the output of the automatic brake request, and thus the period in which the rush current flows through the motors 87 and the period in which the rush currents flow through the motors 200 do not overlap. As a result, the terminal voltage of the battery does not decrease below the minimum drive voltage.

With the vehicle control device according to the above-mentioned embodiment, the start timing of the EPB motors 200 is adjusted so that the period in which the rush current flows through the pump motor 87 and the period in which the rush currents flow through the EPB motors 200 do not overlap each other. As a result, the terminal voltage of the battery can be prevented from decreasing below the minimum drive voltage without changing power supply performance of the battery. As a result, the respective motors 87 and 200 can be appropriately driven.

Moreover, when the automatic brake request and the parking brake request are almost simultaneously output, the automatic brake request, for which promptness is required, is prioritized, thereby driving the pump motor 87. Thus, both the functions of the automatic brake for the collision avoidance and the EPB can be appropriately operated.

In the above description, the vehicle control device according to this embodiment has been described, but the present invention is not limited to the above-mentioned embodiment, and various changes are possible within the range not departing from the object of the present invention.

For example, according to this embodiment, when the own vehicle is likely to collide with an obstacle, the collision avoidance support ECU 20 outputs the automatic brake request to the brake ECU 10, thereby operating the automatic brake, but there may be added processing of the collision avoidance support ECU 20 of further transmitting a throttle fully closing request to an engine ECU (not shown), thereby decreasing the driving forces of the wheels.

Moreover, according to this embodiment, the collision avoidance support control is carried out only when the vehicle speed V is less than the support permission vehicle speed V2, but such a vehicle speed restriction may not be provided.

Moreover, according to this embodiment, the automatic brake is prioritized over the EPB, and when the automatic brake request and the EPB request are simultaneously output, the start timing of the EPB motors 200 is delayed, but the converse configuration may be provided, that is, the start timing of the pump motor 87 may be delayed.

Moreover, according to this embodiment, the EPB is operated by the two EPB motors 200, but for example, one EPB motor (e.g., a configuration in which one motor pulls a parking brake cable) may be used to operate the EPB.

Moreover, according to this embodiment, the brake actuator 100 is configured to include the pump motor 87 for driving the pumps 86Fr and 86Rf for increasing the hydraulic pressure in the wheel cylinders, but the configuration does not always need to be hydraulic. In other words, the brake actuator only needs to include braking motors for generating the braking forces on the wheels during the travel of the vehicle, and to be configured to supply electric power from the in-vehicle battery to the braking motors. For example, the brake actuator may be such a type that the braking motor and the brake pads are mechanically coupled to each other, and the brake pads are pressed against the brake disc or a brake drum by driving the braking motor, thereby generating the braking force on the wheel.

What is claimed is:

1. A vehicle control device, comprising:
   a brake actuator comprising a braking motor for generating a braking force on a wheel of an own vehicle during travel of said own vehicle;
   a parking motor for operating an electric parking brake; and
   a brake electronic control unit configured to:
   output an automatic brake request when said own vehicle is likely to collide with an obstacle;
   output a parking brake request in response to a parking brake operation carried out by a driver;
   drive said braking motor to operate an automatic brake when said automatic brake request is output, and drive said parking motor to operate said electric parking brake when said parking brake request is output;
   shift a start timing of any one of said braking motor and said parking motor so that a period in which a rush current flows through said braking motor when said braking motor is started and a period in which a rush current flows through said parking motor when said parking motor is started do not overlap each other;
   delay timing for starting said parking motor when said parking brake request is output during a period in which said rush current is flowing through said braking motor after said braking motor is started; and
   suspend drive of said parking motor and start said braking motor when said automatic brake request is output during a period in which said rush current is flowing through said parking motor after said parking motor is started,
   wherein said braking motor and said parking motor being configured to be driven by electric power supplied from an in-vehicle battery.

2. A vehicle control device according to claim 1, further comprising a clearance sonar for detecting a distance from said own vehicle to said obstacle,
wherein the brake electronic control unit is configured to output said automatic brake request based on said distance detected by said clearance sonar.

* * * * *